(12) United States Patent
Drechsler et al.

(10) Patent No.: US 10,329,198 B2
(45) Date of Patent: Jun. 25, 2019

(54) ROOFING TILE AND METHOD FOR PRODUCING SUCH A ROOFING TILE

(71) Applicants: Andreas Drechsler, Schaafheim (DE); Michael Friedrich, Obertshausen (DE); Michael Heise, Neu-Bamberg (DE); Jürgen Klein, Rodgau (DE); Stephan Westphal, Echzell (DE); Ben Cranfield, Sussex (GB)

(72) Inventors: Andreas Drechsler, Schaafheim (DE); Michael Friedrich, Obertshausen (DE); Michael Heise, Neu-Bamberg (DE); Jürgen Klein, Rodgau (DE); Stephan Westphal, Echzell (DE); Ben Cranfield, Sussex (GB)

(73) Assignee: Monier Roofing GmbH (DE)

( * ) Notice: Subject to any disclaimer, the term of this patent is extended or adjusted under 35 U.S.C. 154(b) by 0 days.

(21) Appl. No.: 15/552,905

(22) PCT Filed: Feb. 15, 2016

(86) PCT No.: PCT/EP2016/053142
§ 371 (c)(1),
(2) Date: Aug. 23, 2017

(87) PCT Pub. No.: WO2016/134996
PCT Pub. Date: Sep. 1, 2016

(65) Prior Publication Data
US 2018/0029940 A1 Feb. 1, 2018

(30) Foreign Application Priority Data
Feb. 23, 2015 (DE) .................. 10 2015 102 530

(51) Int. Cl.
*C04B 28/04* (2006.01)
*C04B 14/16* (2006.01)
(Continued)

(52) U.S. Cl.
CPC ............ *C04B 28/04* (2013.01); *C04B 14/062* (2013.01); *C04B 14/16* (2013.01); *E04D 1/04* (2013.01);
(Continued)

(58) Field of Classification Search
CPC ....... C04B 28/04; C04B 14/16; C04B 14/062; C04B 2111/00129; C04B 2111/00068; C04B 2111/00594; E04D 1/04
See application file for complete search history.

(56) References Cited

U.S. PATENT DOCUMENTS

| | | | |
|---|---|---|---|
| 4,673,659 A | 6/1987 | Wood et al. | 106/98 |
| 5,106,557 A | 4/1992 | Rirsch et al. | 264/118 |

(Continued)

FOREIGN PATENT DOCUMENTS

| | | | | |
|---|---|---|---|---|
| DE | 38 86 525 T2 | 6/1994 | | |
| GB | 2248578 A | * 4/1992 | | B28B 1/16 |

(Continued)

OTHER PUBLICATIONS

International Search Report dated May 6, 2016 in corresponding PCT International Application No. PCT/EP2016/053142.
(Continued)

*Primary Examiner* — Nathan L Van Sell
(74) *Attorney, Agent, or Firm* — Ostrolenk Faber LLP

(57) ABSTRACT

A roofing tile composed of concrete material and a method for producing such a roofing tile. The concrete material contains a binder, a gravel, a light-weight aggregate, and added water. The roofing tile has at least one watercourse and a lateral interlocking joint having a covering fold and a water fold. The ratio of water to binder is less than 0.3, the light-weight aggregate is composed of a material that is hydrophobic and/or not hygroscopic, and the roofing tile has a density in the range of 1.6 g/cm$^3$ to 1.9 g/cm$^3$ after the hardening. The roofing tile has a thickness of 5 mm to 9 mm, preferably 7 mm to 8 mm, in the highly loaded regions, preferably in the region of the watercourse.

23 Claims, 2 Drawing Sheets

Figure 1:
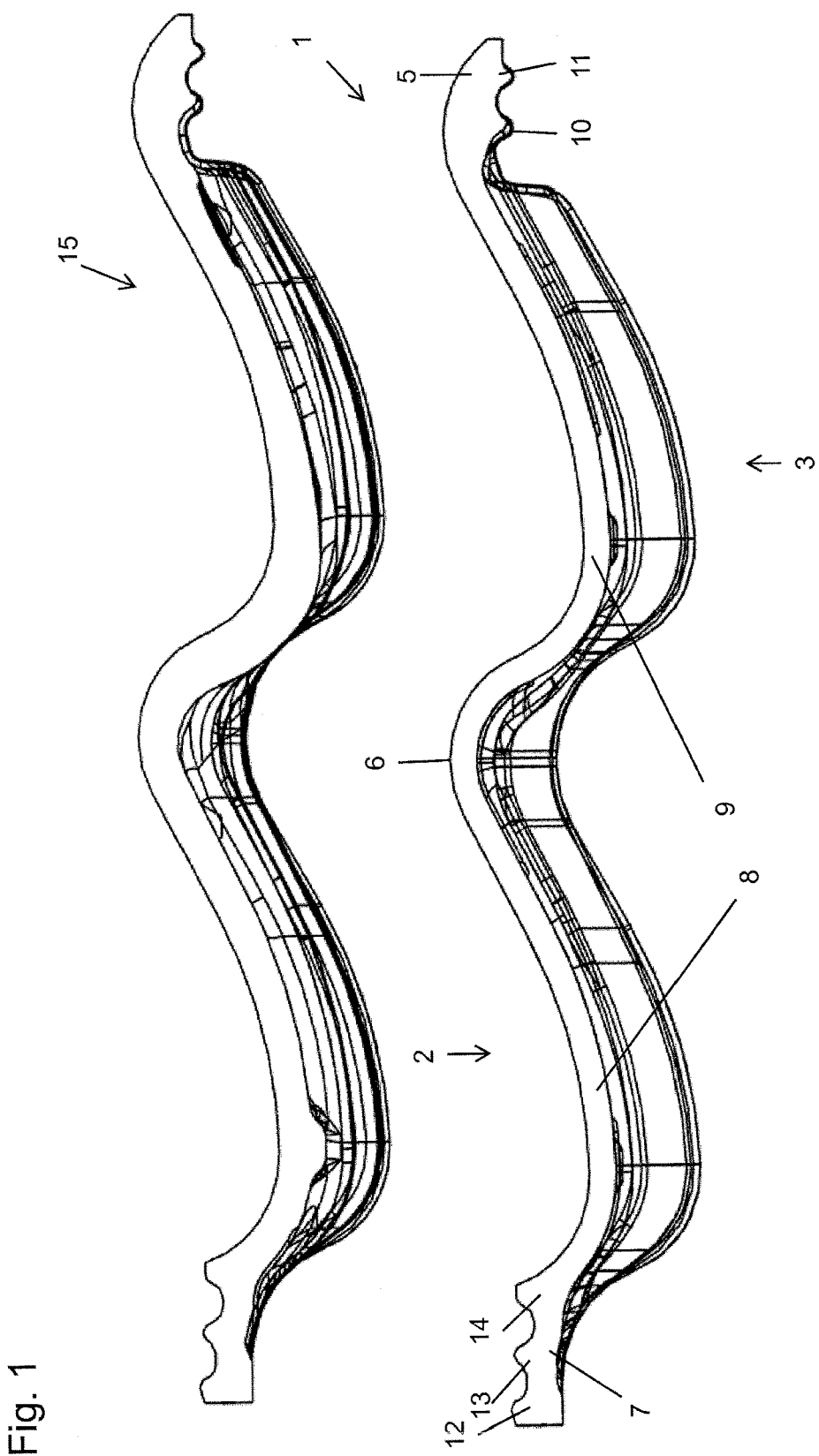

(51) Int. Cl.
*C04B 14/06* (2006.01)
*E04D 1/04* (2006.01)
*C04B 111/00* (2006.01)

(52) U.S. Cl.
CPC ............ *C04B 2111/00068* (2013.01); *C04B 2111/00129* (2013.01); *C04B 2111/00594* (2013.01)

(56) References Cited

U.S. PATENT DOCUMENTS

| | | | | |
|---|---|---|---|---|
| 5,108,679 A | * | 4/1992 | Rirsch | C04B 28/02 106/675 |
| 5,941,039 A | * | 8/1999 | Law | E04D 1/04 52/533 |
| 2005/0284339 A1 | * | 12/2005 | Brunton | C04B 28/02 106/713 |

FOREIGN PATENT DOCUMENTS

| | | |
|---|---|---|
| GB | 2 266 904 A | 11/1993 |
| WO | WO 94/24062 | 10/1994 |

OTHER PUBLICATIONS

Written Opinion dated Sep. 1, 2016 in corresponding PCT International Application No. PCT/EP2016/053142.

* cited by examiner

ROOFING TILE AND METHOD FOR PRODUCING SUCH A ROOFING TILE

CROSS-REFERENCE TO RELATED APPLICATIONS

The present application is a 35 U.S.C. §§ 371 national phase conversion of PCT/EP2016/053142, filed Feb. 15, 2016, which claims priority to German Patent Application No. 10 2015 102 530.2, filed Feb. 23, 2015, the contents of both of which are incorporated herein by reference. The PCT International Application was published in the German language.

BACKGROUND

Field of the Invention

The invention relates to a roofing tile composed of concrete material comprising a binder, a rock particle fraction, a lightweight aggregate and added water, which has at least one watercourse and a lateral interlocking joint consisting of a covering fold and a water fold.

The invention also relates to a process for producing such a roofing tile which comprises the following steps: mixing the concrete material comprising binder, a rock particle fraction, a lightweight aggregate and added water; shaping the mixture by means of extrusion; parting the shaped extrudate obtained to form sections; and curing the sections.

Related Art

The production of roofing tiles composed of concrete material is, as described in DE 35 22 846 A1, often carried out by extrusion. Here, fresh concrete is applied to a continuous belt of lower molds and pressed by means of a profiled roller into the lower molds, so as to form a continuous strip of compacted fresh concrete which is referred to as extrudate and whose cross-sectional profile corresponds to that of the subsequent roofing tile. The continuous strip is subsequently cut into individual roofing tiles which are cured by drying.

The roofing tiles produced by such a process using conventional concrete materials basically have a good bending and impact strength and also a high freezing resistance and thus satisfy the minimum requirements set down in EN490/491. However, such roofing tiles have a relatively high weight of from about 4.5 kg to 8.0 kg per roofing tile. The weight per unit area is, however, relevant to the loading of the substructure of the roof.

Here, it has to be taken into account that, depending on the dimensions of the individual roofing tile, a different number of roofing tiles is necessary for covering a roof area of 1 m². The weight per unit area is therefore defined as the total weight of the roofing tiles laid per m² of roof area. In the case of roofing tiles having dimensions customary for the sector, for example a length=0.42 m and a width=0.3 m, about 9-11 roofing tiles are required for covering a roof area of 1 m², giving a weight per unit area of about 40-50 kg/m² of covered roof area.

However, apart from these relatively small roofing tiles, roofing tiles having larger dimensions are also available on the market, in the case of which only 7-9 roofing tiles or 5-7 roofing tiles are required for covering 1 m² of roof area. The larger coverage area of the individual roofing tile enables the laying times and the costs of the work to be reduced. However, this advantage is reduced by a greater weight of the individual roofing tile, which makes handling the large roofing tiles more difficult for the roof tiler during laying. Roofing tiles having a size of 7-9 roofing tiles/m² have an individual weight of about 5.25 kg and a weight per unit area of 36-47 kg/m². In the case of a size of 5-7 roofing tiles/m², the tiles have an individual weight of 8.0 kg and a weight per unit area of 40-56 kg/m². Owing to their relatively great weight, such conventional concrete roofing tiles are not suitable for the renovation of roofs which were previously covered with lightweight roofing materials such as corrugated Eternit sheets, shingles or slate, since the existing substructure of the roof is generally not able to bear the heavy load of the concrete roofing tiles. To be able to continue to use the existing substructure of the roof in the case of renovation in order to save costs, the weight per unit area of the roofing tiles therefore has to be reduced. A reduction in the weight of the individual roofing tile is also desirable in order to make handling of the roofing tiles easier for the roof tiler; this applies particularly in the case of roofing tiles having larger sizes of 5-7 or 7-9 roofing tiles/m². The easier working achieved thereby can make a contribution to reducing occupational sickness for roof tilers.

When reducing the weight of the roofing tiles or the weight per unit area, it has to be taken into account that the geometry of the roofing tile and also the functional elements such as watercourses, lateral folds, tie lugs have to be retained. Only in this way is it ensured that the latter roofing tiles can be combined with conventional roofing tiles to give a roof arrangement and in the case of damage to a conventional roofing tile this can if desired be replaced by a lighter roofing tile.

While maintaining the outer dimensions and also the functional elements, it is possible to reduce the weight of concrete roofing tiles by reducing the density of the roofing tiles.

AT E 52 214 B1 describes, for this purpose, a concrete mixture in which the otherwise customary silica sands are replaced by lightweight aggregates in order to reduce the density. However, the lightweight aggregates used here have a high water content which is reflected in the water/cement value (W/C value) which defines the ratio of water to the binder cement. A W/C value of from 0.45 to 1.00 is therefore proposed.

This value is relatively high compared to conventional concrete roofing tiles, which have a W/C value of from 0.35 to 0.45, which is disadvantageous because the water present in the lightweight aggregates cannot be kept in the lightweight aggregates during storage of the concrete roofing tiles produced but instead is slowly given off. This results in residual stresses between the still moist core and the relatively dry surface of the roofing tile, so that the strength, which initially corresponds to that of conventional roofing tiles, decreases. Although this effect is only temporary as long as there are moisture content differences between core and surface, it can persist for a number of months because of the large amounts of the water stored in the core of the lightweight aggregates. The minimum requirements pursuant to EN490/491 can then be attained neither after 28 days nor in the case of the covering which normally follows.

In order to keep the water in the lightweight aggregates, DE 38 86 5252 T2 proposes the use of a thickener. A polymer which is intended to equalize the strength decrease resulting from the use of lightweight aggregates is used for this purpose. However, these constituents are very expensive, which leads to a 5-fold increase in the materials costs compared to conventional concrete mixtures. A product produced using such a concrete mixture is therefore uneconomical compared to the roofing tiles produced using conventional concrete mixtures.

A further possible way of achieving a reduction in the weight of the roofing tiles is to reduce the thickness of the roofing tile.

However, such a reduction in weight is, like the use of lightweight aggregates, associated with a reduction in the strength of the roofing tiles. This strength decrease has to be compensated for by increasing the strength of the concrete material used.

For this purpose, U.S. Pat. No. 5,106,557 B, for example, proposes the use of fiber reinforcements. Such roofing tiles typically contain from 4 to 6% by volume of fibers. These fibers can be polymer fibers or cellulose fibers. However, such fiber reinforcements can be used only up to a particular proportion by volume. If the proportion by volume exceeds 0.5%, the concrete composition can no longer be extruded. A further disadvantage of the addition of fibers to increased strength is that the fibers only bring about a contribution to an increase in strength when the binder matrix already has cracks. Firstly invisible damage can occur in this way, which later puts the impermeability and freezing resistance in question.

Without the use of fibers, the density of the concrete material has to be increased in order to compensate for the decrease in strength caused by the reduction in thickness. This in turn leads to an increase in the weight of the roofing tiles. There are limits to the reduction in weight by reducing the thickness of the roofing tiles due to the required increase in the density of the concrete mixture when at the same time the strength requirements are to correspond to the minimum requirements pursuant to EN490/491.

These limits are demonstrated, in particular, by GB 2 266 904 A. A reduction in the thickness of the roofing tile can here only bring about a reduction in the weight per unit area of the roofing tiles to a range from 36 kg/m$^2$ to 42 kg/m$^2$. However, roofing tiles having such a weight per unit area are still too heavy to be able to be used for renovation of roofs which were previously covered with lightweight roofing materials, since at least a weight reduction by about 45% to a weight per unit area of about 25 kg/m$^2$ has to be achieved for such use.

SUMMARY

It is therefore an object of the present invention to overcome these and further disadvantages of the prior art and provide a roofing tile composed of concrete material and also a process for producing such a roofing tile, with the roofing tile being able to be produced economically at low materials costs by extrusion and at the same time having a significantly reduced weight and nevertheless having long-term strengths comparable to those of conventional roofing tiles. The roofing tile should be able to be combined with further roofing tiles and with conventional roofing tiles to give a roof covering arrangement.

The above object is achieved by a roofing tile characterized in that the ratio of water to binder is less than 0.3, the lightweight aggregate consists of a material which is hydrophobic and/or nonhygroscopic, the roofing tile after curing has a density in the range from 1.6 g/cm$^3$ to 1.9 g/cm$^3$, where the roofing tile has a thickness of from 5 mm to 9 mm, preferably from 7 mm to 8 mm, in highly loaded regions located between the covering fold and the water fold, preferably in the region of the watercourse.

The object is further achieved by a process characterized in that the ratio of water to binder is less than 0.3, the lightweight aggregate consists of a material which is hydrophobic and/or nonhygroscopic, the roofing tile after curing has a density in the range from 1.6 g/cm3 to 1.9 g/cm3 and has a thickness of from 5 mm to 9 mm, in the highly loaded regions.

Other advantageous embodiments may also be derived from the descriptions herein.

The invention relates to a roofing tile composed of a concrete material comprising a binder, a rock particle fraction, a lightweight aggregate and added water, which has at least one watercourse and a lateral interlocking joint consisting of a covering fold and a water fold, wherein the ratio of water to binder is less than 0.3, the lightweight aggregate consists of a material which is hydrophobic and/or nonhygroscopic, the roofing tile after curing has a density in the range from 1.6 g/cm$^3$ to 1.9 g/cm$^3$ where the roofing tile has a thickness of from 5 mm to 9 mm, preferably from 7 mm to 8 mm, in the highly loaded regions, preferably in the region of the watercourses.

The abovementioned inventive combination of features reduces the weight of the individual roofing tile and thus also the weight per unit area. The reduction in the individual weight of the roofing tile assists handling, in particular at relatively large sizes, and the reduction in the weight per unit area achieved at the same time allows use in the renovation market for houses having relatively weak substructures of the roof. The desired reduction in weight is achieved firstly by the use of lightweight aggregates and secondly by a reduction in the thickness of the roofing tile.

Since the reduction occurs mainly in the highly loaded regions, the geometry of the lateral interlocking joint can be retained, as a result of which the roofing tile according to the invention can be combined not only with further roofing tiles according to the invention but also with conventional roofing tiles to give a roof covering arrangement. It has surprisingly been found that a reduction in the highly loaded regions in particular also brings about a more rapid equalization of core and outer-region moisture content. The highly loaded regions show up particularly when a force acts on the upper side of the roofing tile. Such a force is exerted, for example, when the surface is walked on by a worker during installation of the roofing tiles. This force acts initially as compressive stress on the upper side, but leads to a tensile stress on the underside of the roof. The regions of the watercourses between covering fold and middle rise and also between middle rise and water fold, in particular, are loaded to a relatively great extent. If, in particular, a reduction to a thickness of from 5 mm to 9 mm, preferably from 7 mm to 8 mm, is made in this region of the watercourses, this leads to particularly rapid and uniform equalization of core to outer-region moisture content. As a result of this equalization, the moisture loss which occurs over time due to slow exchange of core and outer-region moisture content is avoided.

To bring about a further reduction in the weight per unit area, the thickness reduction is, according to the invention, combined with a reduction in the density of the roofing tile. For this purpose, the concrete material contains a lightweight aggregate in addition to the constituents necessary for forming the concrete material, e.g. binder, rock particle fraction (gravel or sand) and added water. The selection of the material of the lightweight aggregate from a nonhygroscopic material, i.e. a material which absorbs no or only very little water, is particularly advantageous since these materials do not absorb the in any case small amounts of water laid down by the low water/cement value. This not only avoids a change in the consistency of the mixture but at the same time the advantage of rapid equalization of core to outer-region moisture content achieved by the thickness reduction is reinforced since no water which could be given off subsequently is stored in the lightweight aggregates.

The inventive combination of the technical features has made it possible to provide a roofing tile composed of concrete material which can be combined with conventional roofing tiles to give a roof covering arrangement and which can be produced economically at low materials costs and at the same time has a significantly reduced weight but nevertheless permanently has strengths comparable with those of conventional roofing tiles.

In a preferred embodiment, the roofing tile comprises from 1300 $cm^3$ to 1700 $cm^3$ of concrete material, with the roofing tile having, in particular, a size at which from 9 to 11 roofing tiles/$m^2$ can be laid. In an alternative embodiment, the roofing tile comprises from 1700 $cm^3$ to 2250 $cm^3$ of concrete material, with the roofing tile having, in particular, a size at which from 7 to 9 roofing tiles/$m^2$ can be laid. In a further alternative embodiment, the roofing tile comprises from 2250 $cm^3$ to 2750 $cm^3$ of concrete material, with the roofing tile having, in particular, a size at which from 5 to 7 roofing tiles/$m^2$ can be laid.

The alternative preferred embodiments define the amount of concrete material used per roofing tile as a function of the respective size. In this way, the weight per $m^2$ is significantly reduced and the strength is nevertheless retained in comparison with conventional roofing tiles.

The open porosity and the total porosity can be employed to describe the pore structure. The total porosity describes the volume of all pores in the roofing tile. It is made up of the sum of the hollow spaces which are connected to one another and to the surroundings (open porosity) and the hollow spaces which are not connected to one another (closed porosity). The open porosity is important in the case of roofing tiles since it relates to the pores accessible to water. A high open porosity is undesirable in roofing tiles, since water penetrating by capillary action into the pores leads to fracture as a result of freezing in winter and reduces the freezing-thawing alternation resistance of the roofing tiles. It is particularly advantageous for the roofing tile to have a total porosity above 25% and an open porosity of less than 10%. Compared to conventional roofing tiles, the roofing tiles of the invention thus have an increased total porosity and a reduced open porosity. The roofing tiles of the invention are thus not only lighter but they additionally have an improved freezing-thawing alternation resistance.

Furthermore, it has been found to be advantageous for the lightweight aggregate to comprise less than 5% by weight of water before mixing. The advantage here is that the lightweight aggregates are dry when delivered and no additional water is thus introduced into the mixture by the lightweight aggregate. Thus, there is no increase in the water/cement value, so that a decrease in strength of the concrete roofing tiles during storage is prevented.

In an advantageous embodiment of the present invention, the lightweight aggregate is selected from the group consisting of hollow glass spheres, expanded clay, pumice and mixtures thereof. These materials are particularly suitable for reducing the density of the concrete material.

It is particularly advantageous for the lightweight aggregate to comprise uncrushed and/or coated and/or hydrophobicized expanded clay, hydrophobicized pumice and/or hollow glass spheres and/or mixtures thereof. These materials absorb no or only little water, so that these aggregates do not withdraw any water from the concrete material and also do not store any water. In this way, the formation of a water reservoir as a cause of the decrease in strength occurring over time is effectively prevented.

In a specific embodiment, the binder comprises cement and microsilica. Such a composition improves the cement matrix, with the microsilica at least partly compensating for the decrease in strength due to the lightweight aggregates used. At the same time, the use of microsilica leads to a reduction in the open porosity and thus to an improvement in the freezing-thawing alternation resistance.

In an advantageous embodiment, the binder is a mixture in which the constituents of the mixture are selected from the group consisting of portland cement, microsilica and high performance plasticizers. The use of the high performance plasticizer makes it possible to obtain, despite the low water/cement value, a concrete material which has a consistency which can be extruded easily.

It is particularly advantageous for the ratio of water to binder to be 0.25 and/or the mixture moisture content of the concrete material to be less than or equal to 11%. At these values, only a small amount of water or no water at all remains in the roofing tile, so that only little water can be taken up by lightweight aggregates and a high decrease in strength is not able to occur during storage of the roofing tile. Crack formation and a deterioration in strength during storage are thus successfully avoided.

In a specific embodiment, the roofing tile after curing has a density of 1.8 $g/cm^3$. This value has been found to be particularly advantageous since a reduction in the thickness of the roofing tile to from 7 mm to 8 mm is possible at such a density while nevertheless satisfying the strength requirements of the standard EN 490/491 in the long term.

The roofing tile preferably has a weight per unit area of less than or equal to 35 kg/$m^2$. A roofing tile having such a weight per unit area can, for example, be used for renovation of roofs for which no conventional, heavy roofing tiles can be used. The reduction in the weight per unit area and thus also the weight of the individual roofing tile also simplifies laying of the roofing tiles by the roof tiler.

In a further embodiment of the present invention, the roofing tile has a weight per unit area of less than or equal to 25 kg/$m^2$ when covering a roof area of 1 $m^2$. Such a roofing tile can be used in many ways but in particular for renovation of buildings hitherto roofed with relatively light roofing materials.

In a preferred embodiment, the roofing tile weighs less than or equal to 3.2 kg per tile, with the roofing tile having, in particular, a size at which from 9 to 11 roofing tiles/$m^2$ can be laid. In an alternative embodiment, the roofing tile weighs less than or equal to 3.85 kg per tile, with the roofing tile having, in particular, a size at which from 7 to 9 roofing tiles/$m^2$ can be laid. In a further alternative embodiment, the roofing tile weighs less than or equal to 5.85 kg per tile, with the roofing tile having, in particular, a size at which from 5 to 7 roofing tiles/$m^2$ can be laid.

With the above: mentioned alternative weights of the roofing tiles, it can be ensured, depending on the size, that the weight per unit area is significantly reduced compared to conventional roofing tiles. These roofing tiles can thus be used more flexibly and be laid more conveniently for the roof tiler.

Furthermore, the invention provides a process for producing such a roofing tile, in which the concrete material comprising binder, a rock particle fraction, a lightweight aggregate and added water is firstly mixed and the mixture is subsequently shaped by extrusion.

Roofing tiles are then obtained from the resulting shaped extrudate by dividing and are cured. Here, the ratio of water to binder is less than 0.3, the lightweight aggregate consists of a material which is hydrophobic and/or nonhygroscopic and the roofing tile after curing has a density in the range from 1.6 g/cm³ to 1.9 g/cm³ and the highly loaded regions, preferably in the region of the watercourses, have a thickness of from 5 mm to 9 mm, preferably from 7 mm to 8 mm.

Such a process has, in particular, economic advantages since the machines used hitherto for use of conventional roofing tiles can continue to be used and it is not necessary to procure new machines. In addition, the extrusion process has already become established as reliable production process for conventional concrete roofing tiles, so that a uniform and inexpensive result can be achieved. In a preferred embodiment of the process, the roofing tile comprises from 1300 cm³ to 1700 cm³ of concrete material, with the roofing tile having, in particular, a size at which from 9 to 11 roofing tiles/m² can be laid. In an alternative embodiment, the roofing tile comprises from 1700 cm³ to 2250 cm³ of concrete material, with the roofing tile having, in particular, a size at which from 7 to 9 roofing tiles/m² can be laid. In a further alternative embodiment, the roofing tile preferably comprises from 2250 cm³ to 2750 cm³ of concrete material, with the roofing tile having, in particular, a size at which from 5 to 7 roofing tiles/m² can be laid.

The alternative embodiments of the process of the invention make it possible to produce roofing tiles having a reduced weight per unit area and a strength which is comparable to that of conventional roofing tiles.

Further features, details and advantages of the invention can be derived from the wording of the claims and from the following description of working examples and the embodiments depicted by way of example in the drawings.

The roofing tiles according to the invention are produced in an extrusion process. For this purpose, the constituents of the concrete material, namely binder, rock particle fraction, hydrophobic and/or nonhygroscopic lightweight aggregate and added water, are firstly mixed. Here, the ratio of water to binder is less than 0.3. The mixture is subsequently introduced into an extrusion machine for roofing tiles, which produces an uninterrupted strip having a profile corresponding to the cross section of the roofing tile from the concrete material mixture by means of extrusion. This extrudate which is located on a continuous train of lower molds is subsequently cut into individual roofing tiles. The configuration of the extrusion machine and the size of the lower molds is dependent on the size of the roofing tile to be produced. Extrusion is carried out in such a way that the extruded roofing tiles comprise, for example, from 1 300 cm³ to 1 700 cm³ of concrete material per roofing tile at a size of from 9 to 11 roofing tiles/m² and in the highly loaded regions, preferably in the region of the watercourses, have a thickness of from 5 mm to 9 mm, preferably from 7 mm to 8 mm. Curing of the roofing tiles is subsequently carried out, after which the individual roofing tiles have a density in the range from 1.6 g/cm³ to 1.9 g/cm³. It goes without saying that larger lower molds and other extruder settings can also be used in the production of roofing tiles having larger sizes (7-9 roofing tiles/m², 5-7 roofing tiles/m²) or volumes of concrete material (1700-2250 cm³, 2250-2750 cm³). The roofing tiles produced by such a process all permanently have strengths comparable to those of conventional roofing tiles.

Roofing tiles which are produced according to the above description differ significantly in terms of their pore structure from conventional roofing tiles. The open porosity and the total porosity can be employed for describing the pore structure. The total porosity describes the volume of all pores in the roofing tile and the open porosity describes the pores which are accessible to water. While the total porosity is a method-independent materials property, the measured value for the open porosity depends on the conditions under which the water absorption is measured.

As measurement method for measuring the total porosity, it is possible to use, for example, a method in which the total porosity based on true and apparent density is determined. For this purpose, some test specimens are firstly knocked out from the roofing tile to be examined. That can be, in particular, at regions out of the water fold, in the region between the water fold and middle rise, in the region of the middle rise or of the covering fold. The test specimens knocked out are dried at 105° C. for at least two hours in a drying oven and subsequently cooled to room temperature. This step is followed by a hydrophobicizing step in which the specimens are dipped into the hydrophobicizing solution until no more air bubbles are formed. After renewed drying at 105° C. and subsequent cooling to room temperature, the weight of the individual test specimens is determined by weighing (W1). The weight of the test specimen in a state in which the test specimen is completely immersed in demineralized water is subsequently determined (W2). At the same time, the water temperature is measured and the density of the water at the measured temperature is determined with the aid of a density table.

In addition, the true density of the test specimens is determined by means of pycnometry.

The total porosity can be calculated as follows from the parameters determined:

$$\text{Total porosity (\% by volume)} = \frac{\text{True density } \rho[\text{g/cm}^3] - \text{Apparent density } \rho_{bulk}[\text{g/cm}^3]}{\text{True density } \rho[\text{g/cm}^3]} * 100\%$$

where $\rho_{bulk}$=Apparent density of the roofing tile [g/cm³]=(W1/(W1−W2))*$\rho_w$ W1 Weight of the test specimen on weighing after the first cooling to room temperature [g]

W2 Weight of the test specimen on weighing underwater [g]

$\rho_w$ Density of the water at the corresponding temperature [g/cm³]

The total density determined by means of the abovementioned method can be employed for calculating the open porosity.

The test specimens are for this purpose firstly dried at 105° C. for at least three hours and subsequently cooled to room temperature. The weight of the dry test specimens is subsequently determined ($M_{dry}$). The test specimens are then stored underwater for one week, with all test specimens being completely immersed underwater. After one week, the test specimens are taken out from the water, dried on the surface and their weight is determined ($M_{wet}$). In addition, the weight in a state in which the test specimen is completely immersed in deionized water is determined ($M_{under}$). At the same time, the water temperature is measured and the density of the water at the measured temperature is determined with the aid of a density table.

The open porosity can then be determined with the aid of the following formulae:

$$\text{Water absorption [\% by mass]} = \frac{(M_{wet} - M_{dry})}{(M_{dry})} \times 100\%$$

$$\begin{aligned}\text{Open porosity [\% by volume]} &= \text{Water absorption} \times \text{Bulk density} \\ &= \frac{(M_{wet} - M_{dry})}{(M_{dry})} \times 100\% \times \\ &\quad \frac{M_{dry} \times \text{Water density}}{(M_{under})}\end{aligned}$$

$$\text{Bulk density [g/cm}^3\text{]} = M_{dry} \times \text{water density } M_{under}$$

$$\text{Total density [\% by volume]} = \frac{(\text{absolute density} - \text{bulk density})}{\text{Bulk density}} \times 100\%$$

M in [g]
Water density [g/cm³]

Using the above-described methods, the following values are obtained for conventional roofing tiles and roofing tiles according to the invention:

|  | Total porosity | Open porosity |
| --- | --- | --- |
| conventional roofing tiles | 17-20% | 11-13% |
| roofing tiles according to the invention | >25 | <10% |

The concrete material can, for example, have the following composition:

EXAMPLE 1

| Constituent | Amount in kg |
| --- | --- |
| Expanded clay 1-2 mm | 90 |
| Silica sand 0-2 mm | 517 |
| Cement CEM I 52.5 R | 209 |
| Microsilica | 30 |
| Plasticizer | 3 |
| Iron oxide pigment | 5 |
| Water | 55 |

The concrete material had a mixture moisture content of 6.30%.

Using this concrete material, roofing tiles which had an average weight of 2685 g and thus a weight per unit area of 24.2 kg/m² (at 9 roofing tiles/m²) were extruded.

The roofing tiles attain strengths comparable to those of conventional roofing tiles and meet the requirements of EN 490/491.

In another working example, the concrete material can, for example, have the following composition:

EXAMPLE 2

| Constituent | Amount in kg |
| --- | --- |
| Expanded clay 1-2 mm | 75 |
| Silica sand 0-2 mm | 517 |
| Cement CEM I 52.5 R | 195 |
| Microsilica | 22 |
| Plasticizer | 5 |
| Iron oxide pigment | 7 |
| Water | 58 |

The concrete material had a mixture moisture content of 6.80%.

Using about 1300 cm³ of this concrete material per roofing tile, roofing tiles having an average weight of 2450 g and thus a weight per unit area of 24.5 kg/m² (at 10 roofing tiles/m²) and a density of 1.9 g/cm³ were extruded. The total porosity was 27% and the open porosity was 6.5%.

The roofing tiles had a strength comparable to that of conventional roofing tiles and meet the requirements of EN 490/491.

In another working example, the concrete material can have, for example, the following composition:

EXAMPLE 3

| Constituent | Amount in kg |
| --- | --- |
| Expanded clay 1-2 mm | 164 |
| Silica sand 0-2 mm | 375 |
| Cement CEM I 52.5 R | 182 |
| Microsilica | 20 |
| Plasticizer | 2 |
| Iron oxide pigment | 4 |
| Water | 69 |

The concrete material had a mixture moisture content of 8.30%.

Using about 1670 cm³ of this concrete material per roofing tile, roofing tiles having a thickness of about 9 mm in the region of the watercourses and an average weight of 2770 g and thus a weight per unit area of 24.9 kg/m² (at 9 roofing tiles/m²) were extruded. The roofing tiles had a density of 1.66 g/cm³ and a strength comparable to that of conventional roofing tiles and meet the requirements of EN 490/491. The open porosity was 32% and the open porosity was 8.3%.

In another working example, the concrete material can have, for example, the following composition:

EXAMPLE 4

| Constituent | Amount in kg |
| --- | --- |
| Hydrophobicized pumice | 158 |
| Silica sand 0-0.6 mm | 361 |
| Microsilica cement | 364 |
| Plasticizer | 4 |
| Iron oxide pigment | 4 |
| Water | 98 |

The concrete material had a mixture moisture content of 10.00%.

Using this concrete material, flat plates for studying materials properties were extruded. The plates attain, at a density of 1.5 g/cm³, a strength of 3.9 MPa after one day and a bending tensile strength of 7 MPa after twenty-eight days.

However, roofing tiles having sizes at which 9-11, 7-9 and/or 5-7 roofing tiles/m² can be laid can also be extruded using this concrete material.

In another working example, the concrete material can have, for example, the following composition:

EXAMPLE 5

| Constituent | Amount in kg |
| --- | --- |
| Expanded clay | 112 |
| Silica sand 0-0.6 mm | 342 |
| Hollow glass spheres | 65 |
| Microsilica cement | 342 |
| Plasticizer | 2 |
| Iron oxide pigment | 4 |
| Water | 73 |

The concrete material had a mixture moisture content of 7.5%.

Using this concrete material, flat plates for studying materials properties were extruded. The plates attain, at a density of 1.6 g/cm³, a strength of 4.6 MPa after one day and a bending tensile strength of 7.8 MPa after twenty-eight days.

However, roofing tiles having sizes at which 9-11, 7-9 and/or 5-7 roofing tiles/m² can be laid can also be extruded using this concrete material.

In another working example, the concrete material can have, for example, the following composition:

EXAMPLE 6

The starting point is the roofing tile model "Doppel-S" from Braas, which is sold in, inter alia, Germany and Denmark.

This roofing tile model corresponds to a size at which 9-11 roofing tiles/m² can be laid. Here, the roofing tile has a length of 0.42 m and a width of 0.3 m. A conventional roofing tile of this size (Doppel S) normally weighs 4400 g and has a volume of 2000 cm³.

As a result of a reduction in the thickness according to the invention, for example in the region of the watercourses, the tile volume drops to 1455 cm³. This measure reduces the weight of the tile when using normal concrete to 3200 g. If the following formulation is now used for extrusion, a further weight reduction is achieved:

| Constituent | Amount in kg |
| --- | --- |
| Expanded clay 1-2 mm | 90 |
| Silica sand 0-2 mm | 517 |
| Cement CEM I 52.5 R | 209 |
| Microsilica | 30 |
| Plasticizer | 3 |
| Iron oxide pigment | 5 |
| Water | 55 |

The concrete material had a mixture moisture content of 6.30%.

Using this concrete material, roofing tiles having an average weight of 2691 g and thus a weight per unit area of 25 kg/cm² (at an average of 9.3 roofing tiles/m²) were extruded.

The roofing tiles attain strengths comparable to those of conventional roofing tiles and meet the requirements of EN 490/491.

In another working example, the concrete material can have, for example, the following composition:

EXAMPLE 7

The starting point is the roofing tile model "Harzer Pfanne 7" from Braas, which is sold in, inter alia, Germany and Austria. This roofing tile model corresponds to a size at which 7-9 roofing tiles/m² can be laid.

A conventional roofing tile of this size normally weighs 5250 g and has a tile volume of 2386 cm³. As a result of a reduction in the thickness according to the invention, the tile volume drops to 1736 cm³. This measure reduces the weight of the tile when using normal concrete to 3818 g. If the following formulation is now used for extrusion, a further weight reduction is achieved:

| Constituent | Amount in kg |
| --- | --- |
| Expanded clay 1-2 mm | 75 |
| Silica sand 0-2 mm | 517 |
| Cement CEM I 52.5 R | 195 |
| Microsilica | 22 |
| Plasticizer | 5 |
| Iron oxide pigment | 7 |
| Water | 58 |

The concrete material had a mixture moisture content of 6.80%.

Using about 1736 cm³ of this concrete material per roofing tile, roofing tiles having an average weight of 3211 g and thus a weight per unit area of 25 kg/cm² (at an average of 7.8 roofing tiles/m²) and a density of 1.85 g/cm³ were extruded. The total porosity was 27% and the open porosity was 6.5%.

The roofing tiles had a strength comparable to that of conventional roofing tiles and meet the requirements of EN 490/491.

In another working example, the concrete material can have, for example, the following composition:

EXAMPLE 8

The starting point is the roofing tile model "Coppo Big" which is sold in Italy.

This roofing tile model corresponds to a size at which 5-7 roofing tiles/m² can be laid.

A conventional roofing tile of this size normally weighs 8000 g and has a tile volume of 3636 cm³. As a result of a reduction in the thickness according to the invention, the tile volume drops to 2645 cm³. This measure reduces the weight of the tile when using normal concrete to 5818 g. If the following formulation is now used for extrusion, a further weight reduction is achieved:

| Constituent | Amount in kg |
| --- | --- |
| Expanded clay 1-2 mm | 164 |
| Silica sand 0-2 mm | 375 |
| Cement CEM I 52.5 R | 182 |
| Microsilica | 20 |
| Plasticizer | 2 |
| Iron oxide pigment | 4 |
| Water | 69 |

The concrete material had a mixture moisture content of 8.30%.

Using about 2645 cm³ of this concrete material per roofing tile, roofing tiles having a thickness of about 9 mm in the region of the watercourses and an average weight of 4893 g and thus a weight per unit area of 24.4 kg/cm² (at 5 roofing tiles/m²) were extruded. The roofing tiles had a density of 1.85 g/cm³ and a strength comparable to that of conventional roofing tiles and meet the requirements of EN 490/491. The open porosity was 32% and the open porosity was 8.3%.

The concrete formulations indicated in examples 1 to 8 can be used for producing all roofing tile sizes described (9-11, 7-9 and 5-7 roofing tiles/m²) and are not restricted to the sizes cited in the examples.

A density/thickness matrix having values for the production of roofing tiles which have a reduced weight per unit area and thus long-term strengths comparable to those of conventional roofing tiles can be derived from the examples. Such a density/thickness matrix is shown below:

| Density (g/cm³) | Thickness (mm) | Strength requirement (MPa) | Indication of usability |
|---|---|---|---|
| 2.2 | 3 | 15.0 | Very high requirement in respect of the strength |
| 2.1 | 4 | 13.0 | Very high requirement in respect of the strength |
| 2 | 5 | 11.0 | Very high requirement in respect of the strength |
| 1.9 | 6 | 9.0 | Preferred working range |
| 1.8 | 7 | 8.0 | Preferred working range |
| 1.7 | 8 | 7.0 | Preferred working range |
| 1.6 | 9 | 6.5 | Preferred working range |
| 1.5 | 10 | 6.0 | Very high proportion of lightweight aggregates necessary, therefore large strength reduction |
| 1.4 | 11 | 5.5 | Very high proportion of lightweight aggregates necessary, therefore large strength reduction |
| 1.3 | 12 | 5.0 | Very high proportion of lightweight aggregates necessary, therefore large strength reduction |

It can be seen from the matrix that if a reduction in the weight per unit area, for example to about 25 kg/m², is to be achieved mainly by reducing the thickness of the roofing tile, a reduction in the product thickness from a value of from 10 mm to 12 mm typical for conventional conventional roofing tiles to from 3 mm to 4 mm would be necessary. However, such a reduction leads to an excessively great increase in the requirements in respect of the strength of the material. The strength of the concrete material would have to be increased from 5 MPa to 15 MPa. This is not practicable.

A similar situation applies in the case when a reduction in the weight per unit area is to be achieved mainly by reducing the thickness of the roofing tile. At an unchanged product thickness of from 10 mm to 12 mm comparable to conventional roofing tiles, a reduction in the density to a value of from 1.3 g/cm³ to 1.5 g/cm³ would be necessary. However, a very high proportion of lightweight aggregates would have to be used for this purpose and this leads to a great reduction in the strength. This, too, is not practicable.

Specifically a reduction in the product thickness in the region of the watercourses to from 5 mm to 9 mm, preferably from 7 mm to 8 mm, in combination with a density of the roofing tile of from 1.6 g/cm³ to 1.9 g/cm³ has surprisingly been found to be particularly advantageous. In this preferred working range, it is possible to produce roofing tiles which meet the strength requirements.

In order to guarantee a satisfactory strength even over a period of storage, use is made according to the invention of a concrete material which has only a low residual moisture content due to the low water to binder ratio (water/cement value). Here, a water/cement value of 0.25 has been found to be particularly advantageous. In addition, the lightweight aggregates are selected so that they do not absorb these in any case very small amounts of water.

The following table shows the weights per unit area of conventional roofing tiles and the preferred weights per unit area of the roofing tiles according to the invention as a function of the respective preferred roofing tile sizes.

| Roofing tile size Number of roofing tiles/m² | | Conventional roofing tiles Weight per unit area (g/m²) | | Roofing tiles according to the invention Weight per unit area (g/m²) | |
|---|---|---|---|---|---|
| | | from | to | from | to |
| 9 | 11 | 39 600 | 48 400 | 24 218 | 29 600 |
| 7 | 9 | 367 50 | 47 250 | 22 475 | 28 897 |
| 5 | 7 | 40 000 | 56 000 | 24 463 | 34 248 |

One embodiment of a roofing tile according to the invention which has been produced using a concrete material according to one of the examples is shown by way of example in the figures.

Figure 2:
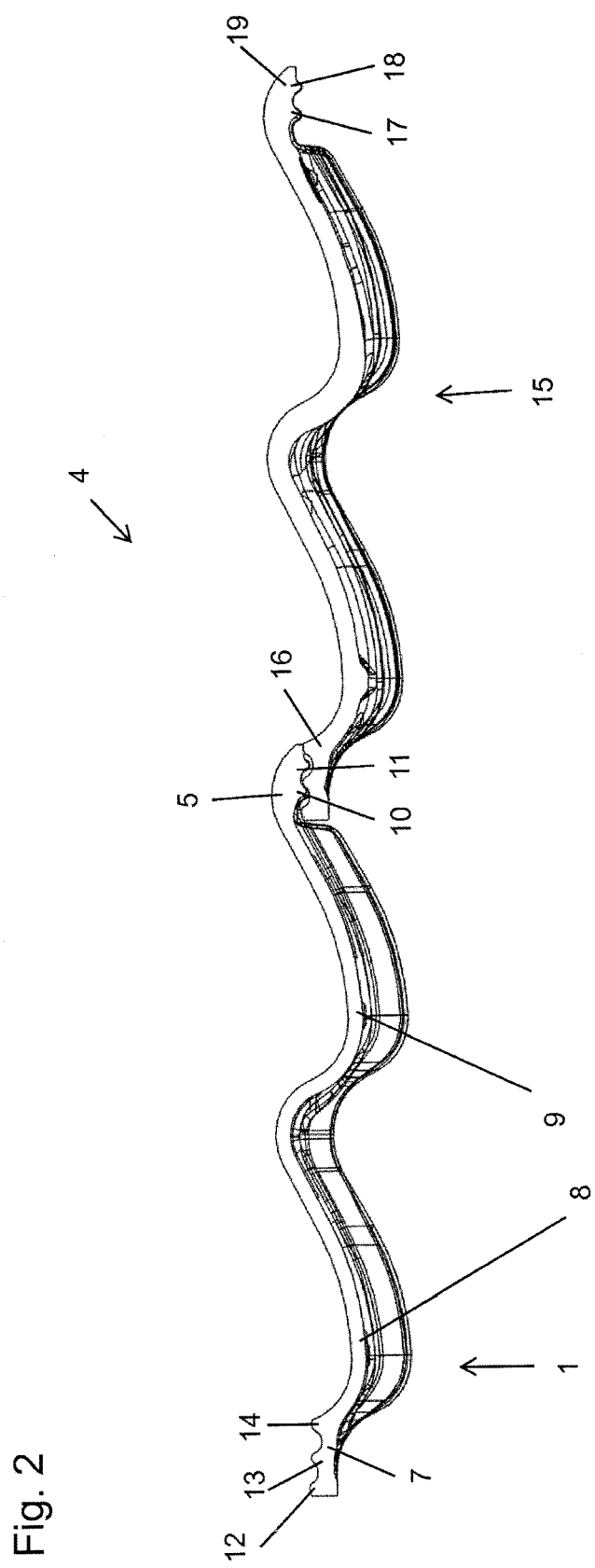

The figures show:

FIG. 1 cross section along the longitudinal axis of a roofing tile according to the invention composed of concrete material and a conventional roofing tile for comparison FIG. 2 side view of roof covering formed from a roofing tile according to the invention and from a conventional roofing tile.

FIG. 1 depicts, in each case in cross section, a roofing tile 1 according to the invention composed of concrete material and a conventional roofing tile 15.

The roofing tile 1 according to the invention has an upper side 2 and an underside 3. In addition, the roofing tile 1 has a covering fold 5, a middle rise 6 and a water fold 7. A watercourse 8, 9 is in each case arranged between the covering fold 5 and the middle rise 6 and also between the middle rise 6 and the water fold 7. The watercourses 8, 9 serve to conduct away water in a controlled manner in the case of rain and at the same time form the highly loaded regions onto which the greatest tensile force is generated in the lower layer when force is applied to the upper side 2.

Two covering fold ribs 10, 11 are arranged on the underside of the covering fold 5. These covering fold ribs 10, 11 are configured in such a way that they can engage in a water fold of a second roofing tile. The water fold 7 of the roofing tile 1 has a plurality of water fold ribs 12, 13, 14. These water fold ribs 12, 13, 14 are configured so that the covering fold ribs of a further roofing tile can be arranged in these water fold ribs 12, 13, 14. Since the geometry of the covering fold 5 and of the covering fold ribs 10, 11 and also the geometry of the water fold 7 and of the water fold ribs 12, 13, 14 are unchanged compared to conventional roofing tiles 15, the lighter roofing tiles 1 according to the invention composed of concrete material can be combined with conventional roofing tiles 15 and joined to form a roof covering as is depicted in FIG. 2.

Such a roof covering 3 made up of a roofing tile 1 according to the invention and a conventional roofing tile 15 is shown in FIG. 2. Here, the covering fold ribs 10, 11 of the covering fold 5 of the roofing tile according to the invention are configured so that they can engage in a water fold 16 of a conventional roofing tile. In addition, it can clearly be seen from the geometry of the lateral fold of the conventional roofing tile and of the roofing tile according to the invention, as depicted in FIG. 2, that it is also possible to arrange the covering fold ribs 17, 18 of the covering fold 19 of the conventional roofing tile 15 in the water fold ribs 12, 13, 14 of the roofing tile 1 according to the invention.

It is additionally apparent from a comparison of the conventional roofing tile 15 with the roofing tile 1 according to the invention that the roofing tile 1 according to the invention has overall a low product thickness despite an unchanged geometry of the lateral fold 5, 7. In particular, the highly loaded regions of the roofing tile 1, especially the watercourses 8, 9, are thinner than in the case of conventional roofing tiles.

The invention is not restricted to one of the above-described embodiments, but can be modified in many ways.

All features and advantages, including structural details, three-dimensional arrangements and process steps which can be derived from the claims, the description and the drawing can be relevant to the invention both on their own and in a variety of combinations.

LIST OF REFERENCE NUMERALS

1 Roofing tile
2 Upper side
3 Underside
4 Roof covering
5 Covering fold
6 Middle rise
7 Water fold
8 Watercourse
9 Watercourse
10 Covering fold rib
11 Covering fold rib
12 Water fold rib
13 Water fold rib
14 Water fold rib
15 Conventional roofing tile
16 Water fold
17 Covering fold rib
18 Covering fold rib
19 Covering fold

The invention claimed is:

1. A roofing tile composed of a concrete material consisting essentially of a binder, a rock particle fraction, a lightweight aggregate, a pigment and added water, which has at least one watercourse and has lateral interlocking joint folds consisting of a covering fold on a first end of the roofing tile and a water fold on an opposite second end of the roofing tile, characterized in that
the ratio of water to binder is less than 0.3,
the lightweight aggregate consists of a material which is hydrophobic and/or nonhygroscopic,
the roofing tile after curing has a density in the range from 1.6 g/cm$^3$ to 1.9 g/cm$^3$, where the roofing tile has a thickness of from 5 mm to 9 mm, in regions configured for being highly loaded in use, located between the first end and the second end, and
the roofing tile has a total porosity above 25% and an open porosity of less than 10%.

2. The roofing tile as claimed in claim 1, characterized in that the roofing tile comprises from 1300 cm$^3$ to 1700 cm$^3$ of concrete material, where the roofing tile has a size at which from 9 to 11 roofing tiles/m$^2$ of roof area can be laid.

3. The roofing tile as claimed in claim 1, characterized in that the roofing tile comprises from 1700 cm$^3$ to 2250 cm$^3$ of concrete material, where the roofing tile has a size at which from 7 to 9 roofing tiles/m$^2$ of roof area can be laid.

4. The roofing tile as claimed in claim 1, characterized in that the roofing tile comprises from 2250 cm$^3$ to 2750 cm$^3$ of concrete material, where the roofing tile has a size at which from 5 to 7 roofing tiles/m$^2$ of roof area can be laid.

5. The roofing tile as claimed in claim 1, characterized in that the lightweight aggregate comprises less than 5% by weight of water before mixing.

6. The roofing tile as claimed in claim 1, characterized in that the lightweight aggregate is selected from the group consisting of hollow glass spheres, expanded clay, pumice and mixtures thereof.

7. The roofing tile as claimed in claim 1, characterized in that the lightweight aggregate comprises uncrushed and/or coated and/or hydrophobicized expanded clay, hydrophobicized pumice and/or hollow glass spheres and/or a mixture thereof.

8. The roofing tile according to claim 1, characterized in that the binder comprises cement and microsilica.

9. The roofing tile as claimed in claim 1, characterized in that the binder is a mixture in which the constituents of the mixture are selected from the group consisting of portland cement, microsilica and plasticizers.

10. The roofing tile as claimed in claim 1, characterized in that the ratio of water to binder is 0.22-0.28.

11. The roofing tile as claimed in claim 10, characterized in that the ratio of water to binder is 0.25.

12. The roofing tile as claimed in claim 1, characterized in that the roofing tile after curing has a density of 1.8 g/cm$^3$.

13. The roofing tile as claimed in claim 1, characterized in that the concrete material has a mixture moisture content of less than or equal to 11%.

14. The roofing tile as claimed in claim 1, characterized in that the roofing tile has a weight per unit area of less than or equal to 35 kg/m$^2$.

15. The roofing tile as claimed in claim 14, characterized in that the roofing tile has a weight per unit area of less than or equal to 25 kg/m$^2$.

16. The roofing tile according to claim 1, wherein said thickness is from 7 mm to 8 mm.

17. The roofing tile according to claim 1, wherein said highly loaded regions are in the region of the watercourse.

18. A process for producing a roofing tile as claimed in claim 1, which comprises the following steps:
mixing the concrete material consisting essentially of binder, rock particle fraction, lightweight aggregate, pigment and added water;
shaping the mixture by means of extrusion; and
parting the shaped extrudate obtained to form sections and curing the sections,
characterized in that
the ratio of water to binder is less than 0.3,
the lightweight aggregate consists of a material which is hydrophobic and/or nonhygroscopic, and the roofing tile after curing has a density in the range from 1.6 g/cm³ to 1.9 g/cm³ and has a thickness of from 5 mm to 9 mm, in the highly loaded regions.

19. The process according to claim 18, wherein said highly loaded regions are in the region of the watercourse.

20. The process according to claim 18, wherein said thickness is from 7 mm to 8 mm.

21. The process for producing a roofing tile as claimed in claim 20, characterized in that the roofing tile comprises from 1300 cm³ to 1700 cm³ of concrete material, where the roofing tile has a size at which from 9 to 11 roofing tiles/m² can be laid.

22. The process for producing a roofing tile as claimed in claim 20, characterized in that the roofing tile comprises from 1700 cm³ to 2250 cm³ of concrete material, where the roofing tile has a size at which from 7 to 9 roofing tiles/m² can be laid.

23. The process for producing a roofing tile as claimed in claim 20, characterized in that the roofing tile comprises from 2250 cm³ to 2750 cm³ of concrete material, where the roofing tile has a size at which from 5 to 7 roofing tiles/m² can be laid.

* * * * *